(12) United States Patent
Winowiecki et al.

(10) Patent No.: US 7,629,417 B2
(45) Date of Patent: Dec. 8, 2009

(54) THERMOPLASTIC COMPOSITIONS AND METHOD OF USE THEREOF FOR MOLDED ARTICLES

(75) Inventors: Kris W. Winowiecki, Howell, MI (US); David R. Harris, Troy, MI (US)

(73) Assignee: Advantage Polymers, LLC, Troy, MI (US)

( * ) Notice: Subject to any disclaimer, the term of this patent is extended or adjusted under 35 U.S.C. 154(b) by 0 days.

(21) Appl. No.: 11/313,347

(22) Filed: Dec. 21, 2005

(65) Prior Publication Data

US 2006/0135679 A1 Jun. 22, 2006

Related U.S. Application Data

(60) Provisional application No. 60/638,549, filed on Dec. 22, 2004.

(51) Int. Cl.
| | |
|---|---|
| C08L 23/10 | (2006.01) |
| C08L 23/16 | (2006.01) |
| C08L 23/20 | (2006.01) |
| C08L 9/00 | (2006.01) |
| C08K 5/10 | (2006.01) |

(52) U.S. Cl. ............ 525/240; 525/232; 524/315; 524/318; 524/285

(58) Field of Classification Search ......... 524/579, 524/582, 583, 318, 315, 322, 574, 240; 525/240, 525/190, 232, 323
See application file for complete search history.

(56) References Cited

U.S. PATENT DOCUMENTS

| | | | | |
|---|---|---|---|---|
| 4,078,020 A | * | 3/1978 | Rose et al. | .......... 525/240 |
| 4,113,804 A | * | 9/1978 | Cotten et al. | .......... 525/232 |
| 4,323,534 A | | 4/1982 | Des Marais | |
| 4,355,425 A | | 10/1982 | Jones et al. | |
| 4,727,112 A | | 2/1988 | Kohyama et al. | |
| 4,727,113 A | | 2/1988 | Kohyama et al. | |
| 4,880,878 A | | 11/1989 | Himes et al. | |
| 4,886,849 A | | 12/1989 | Hwo et al. | |
| 4,889,885 A | | 12/1989 | Usuki et al. | |
| 5,143,978 A | * | 9/1992 | Berta | .......... 525/240 |
| 5,552,469 A | | 9/1996 | Beall et al. | |
| 5,578,672 A | | 11/1996 | Beall et al. | |
| 5,698,624 A | | 12/1997 | Beall et al. | |
| 5,747,560 A | | 5/1998 | Christiani et al. | |
| 5,847,051 A | * | 12/1998 | Hwo et al. | .......... 525/98 |
| 5,866,645 A | | 2/1999 | Pinnavaia et al. | |
| 5,952,093 A | | 9/1999 | Nichols et al. | |
| 5,952,095 A | | 9/1999 | Beall et al. | |
| 5,962,553 A | | 10/1999 | Ellsworth | |
| 5,973,053 A | | 10/1999 | Usuki et al. | |
| 5,993,769 A | | 11/1999 | Pinnavaia et al. | |
| 6,017,989 A | * | 1/2000 | Malm et al. | .......... 524/440 |
| 6,057,396 A | | 5/2000 | Lan et al. | |
| 6,103,817 A | | 8/2000 | Usuki et al. | |
| 6,121,361 A | | 9/2000 | Usuki et al. | |
| 6,126,734 A | | 10/2000 | Beall et al. | |
| 6,180,720 B1 | * | 1/2001 | Collina et al. | .......... 525/191 |
| 6,191,219 B1 | * | 2/2001 | Tanaka et al. | .......... 525/95 |
| 6,228,903 B1 | | 5/2001 | Beall et al. | |
| 6,242,500 B1 | | 6/2001 | Lan et al. | |
| 6,261,640 B1 | | 7/2001 | Pinnavaia et al. | |
| 6,271,298 B1 | | 8/2001 | Powell et al. | |
| 6,277,918 B1 | * | 8/2001 | Collina et al. | .......... 525/191 |
| 6,287,634 B1 | | 9/2001 | Beall et al. | |
| 6,300,419 B1 | | 10/2001 | Sehanobish et al. | |
| 6,365,661 B1 | | 4/2002 | Fischer et al. | |
| 6,465,551 B1 | * | 10/2002 | Zhao et al. | .......... 524/284 |
| 6,534,574 B1 | | 3/2003 | Zhao et al. | |
| 6,559,211 B2 | | 5/2003 | Zhao et al. | |
| 6,599,968 B2 | | 7/2003 | Zhao et al. | |
| 6,599,971 B2 | | 7/2003 | Dotson et al. | |
| 6,642,290 B1 | | 11/2003 | Dotson | |
| 6,753,373 B2 | | 6/2004 | Winowiecki | |
| 6,811,735 B2 | * | 11/2004 | Ueno et al. | .......... 264/293 |
| 6,846,863 B2 | | 1/2005 | Plume et al. | |
| 6,936,650 B2 | | 8/2005 | Mannion et al. | |
| 6,946,507 B2 | | 9/2005 | Mannion et al. | |
| 7,015,287 B2 | * | 3/2006 | Deblauwe et al. | .......... 525/191 |
| 7,276,558 B2 | * | 10/2007 | Hori et al. | .......... 525/191 |
| 2004/0229983 A1 | | 11/2004 | Winowiecki | |
| 2006/0276607 A1 | * | 12/2006 | Ikenaga et al. | .......... 526/348.6 |

FOREIGN PATENT DOCUMENTS

| | | | |
|---|---|---|---|
| JP | 8-99331 | * | 4/1996 |
| WO | WO 2004/087775 A1 | * | 10/2004 |

OTHER PUBLICATIONS

Injection Molding Handbook, Rosato et al., Eds. Kluwer Academic Publishers, Dordrecht, 2000, pp. 347-353.*
JP 8-99331 (Apr. 1996) abstract and translation in English.*

* cited by examiner

*Primary Examiner*—David Wu
*Assistant Examiner*—Rip A. Lee
(74) *Attorney, Agent, or Firm*—Ian C. McLeod

(57) ABSTRACT

A polyolefin composition containing elastomers (plasticizers), crystalline polypropylene, modified by mixing with polybutene-1 and a coupling agent and a bicyclic dicarboxyl acid salt nucleating agent and/or a lubricant which comprises an unsaturated fatty acid ester which acts as a surface modifier in a molded article is described. The composition is adapted to be used with pigments to make finished molded articles which have an appearance of paint covered by a clear coat and which are scratch resistant and have good low temperature (−30° C.) impact properties.

25 Claims, No Drawings

THERMOPLASTIC COMPOSITIONS AND METHOD OF USE THEREOF FOR MOLDED ARTICLES

CROSS-REFERENCE TO RELATED APPLICATION

This application claims priority to Provisional Application Ser. No. 60/638,549 filed Dec. 22, 2004.

STATEMENT REGARDING FEDERALLY SPONSORED RESEARCH OR DEVELOPMENT

Not Applicable

BACKGROUND OF THE INVENTION (1.) Field of the Invention

The present invention relates to novel polyolefin compositions particularly containing significant amounts of elastomers (plasticizers) comprising polybutene-1, a polyolefin other than polybutene-1, a lubricant additive comprising optionally an unsaturated fatty acid ester which acts to reduce surface friction to improve scratch resistance in the molded article, optionally a nanocomposite filler to aid in material stability under temperature changes, optionally a nucleating agent to promote crystallinity and surface hardness, a UV stabilizing package for protection against surface degradation and color change as a result of exposure to ultraviolet light during outdoor exposure, and a coupling agent which links the compositions together. In particular, the present invention relates to polyolefin compositions comprising polypropylene, polybutene-1, a thermoplastic elastomer, the coupling agent and the surface modifiers. The polyolefin compositions are used with color pigments to produce molded articles with a surface finish which has an appearance of clear-coated paint film.

(2.) Description of Related Art

Crystalline polypropylene polymers are well known in the prior art. Isotactic, syndiotactic and atactic forms are described in U.S. Pat. No. 6,300,419 to Sehanobish et al. It can be a homopolymer or a copolymer with another olefinic polymer.

Crystalline polybutene-1 and blends with polypropylene are described in U.S. Pat. Nos. 4,727,112 and 4,727,113 to Kohyama et al; U.S. Pat. No. 4,886,849 to Hwo et al. These blends have good physical properties.

The use of intercalated and exfoliated layered nanocomposites in polymers to increase strength and heat resistance is well known to those skilled in the art. Illustrative are U.S. Pat. No. 4,889,885 to Usuki et al; U.S. Pat. Nos. 5,993,769; 6,261,640; 5,866,645 to Pinnavaia et al; U.S. Pat. No. 6,242,500 to Lan et al; U.S. Pat. No. 6,228,903 to Beall et al.; U.S. Pat. No. 6,057,396 to Lan et al.; U.S. Pat. Nos. 6,287,634; 5,698,624; 5,578,672; 5,552,469 to Beall et al; U.S. Pat. No. 6,271,298 to Powell et al; and U.S. Pat. Nos. 6,121,361; 5,973,053; 6,103,817 to Usuki et al; and U.S. Pat. No. 6,126,734 to Beall et al. U.S. Pat. No. 6,365,661 to Fischer et al; U.S. Pat. No. 5,962,553 to Ellsworth; U.S. Pat. No. 5,952,095 to Beall et al; U.S. Pat. No. 5,952,093 to Nichols; U.S. Pat. No. 5,747,560 to Christian. All of the above referenced patents are incorporated herein by reference in their entireties.

U.S. Pat. No. 6,017,989 to Malm et al describes polyolefins modified by an elastomer (plasticizer) which with pigments are used in automotive molded products. The combination in an unpigmented polymer has a haze level of less than 50% as measured by ASTM D-1003-95. Special effect pigments, whether metallic or pearlescent, are described as being particularly suitable for these polyolefin compositions. U.S. Pat. No. 6,753,373 to Winowiecki, published Application No. 2004/0229983 to Winowiecki, and published Application No. 20040229977 to Watson et al filed Nov. 13, 2003 which are incorporated herein in their entirety in reference, disclose similar low haze compositions. The problem is that, given the low haze requirements (less than 50%) to promote colorability and appearance, these compositions have physical properties which make them less than desirable in automotive applications, such as, limited impact performance and limited scratch and mar resistance.

The problem in the use of elastomers to improve the physical properties is twofold. First, the compositions lose strength because of the elastomer and second, the elastomer contributes to a softer surface, which is thus more easily scratchable. In addition, the use of elastomer to make the part non-brittle at temperatures ranging down to −40° C. increases the haze level above 50%, as required in prior inventions. This requirement greatly limits the usefulness of the compositions for many applications in the automotive industry and elsewhere where cold temperature requirements and other physical properties such as scratch resistance and material shrinkage control require use of impact modifiers and other additives.

OBJECTS

It is therefore an object of this invention to provide polyolefin compositions that are ductile to −30° C. as measured by Multiaxial impact tester, which have excellent scratch resistance, and high gloss as measured by a gloss meter and high DOI (Distinction of Image). The compositions also have been shown to provide outstanding color and gloss retention when compared to painted plastic parts currently being used for exterior ornamentation, subjected to UV exposure and weathering tests conducted in a Xenon Arc weathering chamber. Such comparative tests have shown the current painted plastics parts to lose gloss and crack well before the present compositions. These and other objects will become increasingly apparent by reference to the following description.

SUMMARY OF THE INVENTION

The present invention relates to a thermoplastic composition which comprises in admixture: a crystalline polybutene-1; a crystalline polyolefin other than the polybutene-1; a thermoplastic polyolefin elastomer; a lubricant additive comprising an unsaturated fatty acid ester which reduces surface friction to improve scratch and mar performance and produces a glossy finish; optionally a nucleating agent that acts as a surface hardener; optionally a nano sized filler which improves material stability under temperature change and physical properties; and optionally a coupling agent, which couples the composition together, in an amount up to about 10% by weight.

Further, the present invention relates to a method for the preparation of a molded article which comprises: providing a thermoplastic composition which comprises in admixture: a crystalline polybutene-1; a crystalline polyolefin other than the polybutene-1; a thermoplastic polyolefin elastomer; a lubricant additive comprising an unsaturated fatty acid ester which reduces surface friction to improve scratch and mar performance and produces a glossy finish; optionally a nucleating agent that acts as a surface hardener; optionally a nano sized filler which improves material stability under temperature change and physical properties; and optionally a coupling agent which couples the composition together in an amount up to about 10% by weight; and forming the article in a molding process using a warm highly polished tool to achieve a high gloss scratch resistant surface.

Still further, the present invention relates to a method of recycling a polyolefin composition which comprises: providing a first molded article of a thermoplastic composition as previously described; reducing the molded product to a particulate; and molding the particulate into a second molded article.

Further, the present invention relates to a thermoplastic composition which comprises in admixture; a crystalline polybutene-1; a crystalline polyolefin other than the polybutene-1; a thermoplastic polyolefin elastomer; a nucleating agent comprising a solid bicyclic dicarboxylic acid salt; and optionally a coupling agent, which couples the composition together, in an amount up to about 10% by weight.

Further still, the present invention relates to a method for the preparation of a molded article which comprises: providing a thermoplastic composition which comprises in admixture: a crystalline polybutene-1; a crystalline polyolefin other than the polybutene-1; a thermoplastic polyolefin elastomer; a nucleating agent comprising a solid bicyclic dicarboxylic acid salt; and optionally a coupling agent, which couples the composition together, in an amount up to about 10% by weight; and forming the article in a molding process.

Still further, the present invention relates to a recycled polyolefin composition which comprises: a particulate comprising a ground molded product of the thermoplastic composition as previously described.

Further, the present invention relates to a method of recycling a polyolefin composition which comprises: providing a first molded article of a thermoplastic composition as previously described; reducing the molded product to a particulate; and molding the particulate into a second molded article.

The present invention relates to a thermoplastic composition which comprises in admixture: a crystalline polybutene-1, preferably in an amount between about 0.1 and 60% by weight of the composition; a crystalline polyolefin other than the polybutene-1, preferably in an amount between about 0.1 and 90 percent by weight of the composition; a thermoplastic polyolefin elastomer; a lubricant additive comprising optionally an unsaturated fatty acid ester which acts as a lubricant to reduce surface friction; optionally a nucleating agent that acts to harden the surface and to produce a glossy finish; optionally a nanocomposite filler to control material shrinkage and other physical properties; and optionally a coupling agent, which couples the composition together, in an amount up to about 10% by weight.

Further, the present invention relates to a method for the preparation of a molded article which comprises: providing a thermoplastic composition as previously described.

Still further, the present invention relates to a recycled polyolefin composition which comprises: a method of recycling a polyolefin composition which comprises: providing a first molded article of a thermoplastic composition as previously described; reducing the molded product to a particulate; and molding the particulate into a second molded article. The compound, when combined with monochromatic or special effects pigments and when molded using a highly polished tool surface, creates the appearance and physical characteristics of a coated painted surface.

The present invention has excellent low temperature impact resistance yet provides excellent scratch and mar resistance comparable to a painted plastic part used in the automotive industry. In addition, the present invention provides exceptional DOI (Distinction of Image), high gloss, and depth of color with monochromatic and special effect metallic pigments.

In particular, the present invention relates to a thermoplastic composition which comprises in admixture:
(a) a crystalline polybutene-1 preferably in an amount between about 0.1 and 60% by weight of the composition;
(b) a crystalline polyolefin other than the polybutene-1, preferably in an amount between about 0.1 and 90 percent by weight of the composition;
(c) a thermoplastic polyolefin ethylene/propylene elastomer, such as copolymer/terpolymer or functionalized ethylene copolymer or polyolefin elastomer, preferably having outstanding low temperature properties, also exhibiting high haze and low transmission in about 0.1 to 40% by weight of the composition; and
(d) an unsaturated fatty acid ester which also acts as a surface finish hardener, preferably in an amount between about 0.1 and 0.5 percent by weight of the composition;
(e) optionally a nucleating agent in an amount between about 0.1 and 0.5 percent by weight of the composition;
(f) optionally a nano sized filler in an amount between about 0.1 and 20% by weight of the composition;
(g) optionally a coupling agent which couples the composition together in an amount up to about 10% by weight of the composition.

The present invention also relates to a method for the preparation of a molded article which comprises:
(a) providing a thermoplastic composition as previously described;
(b) forming the part in an injection molding process.

Preferably the composition contains a color pigment. Preferably the composition has been mixed in a compounding extruder and then injection molded in a screw injection molding machine as a molded product. Most preferably the composition is mixed in the extruder without the color pigment, cut into pellets and then molded preferably by injecting the article with the pigment. Preferably a warm (100-170° F.) SPE A-1 polish level tool is used, in order to maximize the highest scratch resistant composition and surface finish. These properties are maximized by the preferred nucleating agent of the Examples and the lubricant additive.

The unsaturated fatty acid esters are at least monosaturated; however, they can be di- or tri- unsaturated and function also as a lubricant. The fatty acid chain is usually between 8 and 30 carbon atoms linked together. The ester chain is typically 1 to 8 carbon atoms long. The lubricant can further comprise fatty acids and/or fatty acid amides where there are 8 to 30 carbon atoms in the fatty acid which can be unsaturated as well. Such lubricants are described in U.S. Pat. No. 6,846,863 to Plume et al, although not in the context of the composition of the present invention.

The present invention further relates to a recycled polyolefin composition which comprises: a particulate comprising a ground molded product of the thermoplastic composition as previously described.

The present invention also relates to a method of recycling a polyolefin composition which comprises:
(a) providing a first molded article of a thermoplastic composition as previously described;
(b) reducing the molded article to a particulate; and
(c) molding the particulate into a second molded article.

As used in the present invention the term "polyolefin composition" or "thermoplastic polyolefin composition" means a mixture of the components in the form of pellets which are non-pigmented, pigmented pellets, unpigmented molded products and pigmented molded products.

The term "molded article" refers to an article which has been subjected to heat and pressure to form an article of manufacture with a shape.

The polyolefin compositions of the present invention when molded with a warm (100-170° F.) very highly polished tool, (SPE #1 polish level) into finished articles provide a glossy finish; excellent scratch resistance, and also very good low temperature properties (−30° C. or lower), and which further are flexible and strong. The molded articles exhibit a high gloss level as if they were covered with a conventional paint which had been clear coated in the conventional manner thus they can replace a high gloss painted part, such as on automobiles. The products are particularly useful in settings where a decorative finish is required.

The polyolefin and polybutene-1 compositions are typically sold without the pigment. In the molding plant, the pigment is added to the polyolefin composition and then injection molded in a mold with a very highly polished finish to form the molded product. This method allows the user to change pigments (color compositions) which are stored in relatively small containers. The need for large silos of single color pigmented polyolefin compositions is thus eliminated. The colorants and pigments may also be added to the composition during the compounding process prior to molding to create a pre-colored formulation, if so desired.

More specifically, the invention relates to automotive exterior/interior automotive vehicle component such as body side moldings/claddings, rocker moldings, wheel flares, bumper fascias, mirror housings, as well as various interior components such as: A,B,C pillars, and glove box covers, various bezels manufactured with this material and color matched with such pigmentation to perfectly match an automotive exterior and interior paint chips, and a method to recycle such components.

The automotive industry has worked for decades to increase fuel efficiency of vehicles by replacing a significant amount of steel once used to manufacture vehicles by lighter parts made out of plastic materials. The industry has moved toward recycling components of vehicles in order to reduce consumption of natural resources. Modern thermoplastics have improved physical properties such as impact strength for a bumper and can be recycled; however, recycling can be difficult because of the automotive painted coatings that have to be removed first.

While the function of modern thermoplastics have been improved, there still is a need to match the quality of a painted surface in terms of depth of color and gloss. Matching a full color palette has been difficult in the past because of the color palette including metallics and special effect pigments. In addition, the vehicle exterior is expected to have excellent depth of color and high gloss. In the past, exterior body panels have either been painted or laminated with a film in order to match the paint chip. However, there are a number of problems relating to these methods of achieving a good color match: 1) The uneven distribution of the coating film; 2) The VOC given off during the coating process; 3) Cracking of the film at low temperatures; 4) Limited flexibility of the film at low temperatures; and 5) Excess of film during the laminating process; 6) Loss of impact properties when the substrate is coated with present basecoat/clearcoat systems. Present bumper fascia's when painted with basecoat/clearcoat systems are brittle even at 0° C.

The present invention provides an exterior molded product that meets key physical properties for use in automotive applications. It also provides the ability to match a paint chip in depth of color, and gloss level without the environmental costs and quality issues involving the painting or laminating, and without the inherent warranty issues resulting from chipping and flaking of painted parts that occur from scratches and abrasions created during normal vehicle use.

The compositions of the present invention are scratch resistant per Chrysler specification LP-463DD18-01. A sample shall be scratched by a 1 mm pin: 1 pass by the following force in newtons:

| Regular Scratch Test | Enhanced Scratch Test |
| --- | --- |
| 2 N | 5 N |
| 3 N | 7 N |
| 4.5 N | 10 N |
| 6 N | 15 N |
| 7 N | 20 N |

*Note: Samples shall be evaluated with a rating of 1 through 5,
1=no scratch
5=severe scratch line.

Maximum allowed scratch severity—rating of 2 for 7N force. The preferred composition had a rating of 2 for a 7N force, and further the preferred composition had a rating of 2 for a 15N force, and a rating of 3 for a 20N force, and the ability to reduce or remove minor scratches and mars with car polish is noteworthy. A key advantage over a painted clear coat surface is the lack of chipping and flaking that occurs due to scratches and abrasions that occur during normal use in automotive and other applications since the pigment is throughout the molded product.

The term "crystalline" means that the polymers and the product have a regular crystal structure which is shown by x-ray diffraction lines. Crystalline polymers provide a very good base for the colorants used in the compositions of the present invention.

The term "terpolymer" means a type of rubbery or elastomer material having different blocks. In general, these materials provide cold temperature impact properties. The compositions of the present invention have very good low temperature properties as measured by Multiaxial impact tester at −30° C.

The monomers from which the polyolefins of the present invention are derived and used in preparing the present invention are preferably $C_2$ to $C_{20}$ olefins. Examples of the $C_2$ to $C_{20}$ alpha-olefins include ethylene, propylene, 1-butene, 2-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene, vinylnorbornene, cyclooctadiene, dicyclooctadiene, methylenenorbornene, 5-methylene-2-normornene, 5-methyl-1,4-hexadiene, and 7-methyl-1,6-octadiene. The polyolefins can be used alone or in combination.

The polyolefins are crystalline. The "crystalline polypropylenes" preferably used in the present invention are well known, have a crystal structure and can be prepared and characterized as described in, for instance, U.S. Pat. No.

6,300,419 to Sehanobish et al, which is incorporated herein by reference. Pre-polymerized polypropylene is typically crystallized with a nucleating agent. Typically, the melt flow rate by ASTM 1238 is between about 0.1 and 100 grams per 10 minutes for the crystalline polypropylene which is used as a component in the present invention.

The separate "crystalline polybutene-1" component used in the present invention is well known and has a crystal structure as described and characterized for instance in U.S. Pat. Nos. 4,727,113; 4,727,112; and 4,886,849, which are incorporated herein by reference. The polybutene-1 typically has a flow rate of between about 0.1 and 100 grams per 10 minutes for the purpose of the present invention.

The preferred crystalline polypropylene and/or polybutene-1 can contain small amounts of other polymerized vinyl monomers. Such polymers include the polyolefins described previously.

Preferred polyolefin composition of the present invention is comprised of a crystalline polypropylene Metallocene homopolymer with a melt flow index from 0.1 to 35 g/10 min. and ranging from 0.1 to 92% by weight; a crystalline polybutene-1 polymer with a melt flow from 0.4 to 20 g/10 min. at about 0.1 to 60% by weight, and an unsaturated fatty acid ester composition as the lubricant, a maleic anhydride coupling agent at about 0.5 to 10% by weight, and optionally a talc type filler or other nano sized filler at about 0.1 to 20% by weight. Another preferred component in this composition is one or more nucleating/clarifying agents in an amount ranging from 0.1 to 0.5% by weight, and finally colorants including special effect pigments.

In another embodiment, the invention provides a method for recycling an automotive vehicle by manufacturing a first exterior component, securing it to an automotive vehicle, removing it after the life of the vehicle, grinding it, injection molding it into another second exterior component.

In particular:

Component 1: The most preferred polyolefin is that of propylene, and polybutene-1 homopolymers, and co-polymers in an amount between 0.1 and 90 percent by weight of the composition. Metallocene based homopolymer polypropylenes are preferred in the invention. Metallocene catalyzed polypropylene homopolymers have excellent optical properties. The Metallocene homopolymer polypropylene of choice has a very low haze level of 8-10% as measured by a 40 mil plaque in ASTM D-1003-95. The Metallocene homopolymer polypropylene also has very low extractables of 1 to 1.5% as compared to another Metallocene based polypropylene of the Ziegler-Nather catalyzed polypropylene which has 2 to 3% extractables. Another property of the preferred Metallocene based polypropylene is a high HDT (heat deflection temperature) as measured by ASTM D648 of 225 F.

Another Metallocene based polymer is an isotactic copolymer of polypropylene. Isotactic polymers (I-PP) tend to be more crystalline in nature, than for example the syndiotactic Metallocene polymers (s-PP). The s-PP is more rubbery like and has a lower flex modulus than the Isotactic polypropylene polymers. The I-PP has a gloss level of 98% as measured by ASTM D-2457.

The polyolefins are preferably aliphatic polyolefins. In automotive applications, the compositions must have excellent outdoor weathering characteristics. Exterior automotive components must meet OEM (original equipment manufacturing) standards for accelerated testing as tested to SAE J1960 and certain long term outdoor weathering in Florida and Arizona.

The polyolefin component of the invention preferably comprise of homopolymers or co-polymers of polyethylene, polypropylene, 1-butene, 2-butene, 1-pentene, 1-octene. Of these, polyethylene and polypropylene homopolymers, and co-polymers are preferred.

Metallocene-catalyzed polyolefins are characterized by a narrow molecular weight distribution. Metallocene-catalyzed polyolefins also exhibit excellent optical clarity. Preferred sources of Metallocene polyolefins are EXXONMOBIL ACHIEVE polymers located in Texas.

Component 2: The semi-crystalline highly Isotactic polybutene-1 polymer is derived from the Ziegler-Natter type of catalyst of butene-1. The structure is as follows:

Butene-1 Polybutene-1

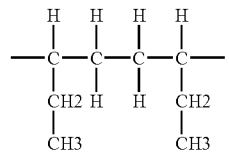

A unique attribute of the polybutene-1 is to form polymorphs.

| Metastable → | Tetragonal → | Hexagonal |
|---|---|---|
| | (Metastable) | |
| Initial Properties | | 7-10 days Properties |
| Hardness: 39D Tensile Stress: 4 MPa Tensile Modulus: 200 MPa | | Hardness: 55D Tensile Stress: 15 MPa Tensile Modulus: 250 MPa |

The tetragonal (metastable state) is formed and then within 7-10 days form another state called a Hexagonal state is formed. The Hexagonal state is preferred because the surface hardens, tensile strength increases and tensile modulus increases.

The present invention preferably has polybutene-1 ranging from 0.1 to 60% by weight. The optimum percent polybutene-1 at 20.0% by weight for body side/cladding applications. The preferred source of polybutene is from Basell Polyolefins located in Lansing, Mich.

The key attributes of polybutene-1 include: low fogging tendency, superior toughness, good abrasion resistance, excellent creep resistance and tear strength. The transformation into a harder surface state after injection molding is desirable for automotive exterior/interior parts as well as many non-automotive parts.

Component 3: The thermoplastic elastomers (particularly terpolymers) as described in Malm et al cited previously or rubber may include olefinic elastomers, such as EPM or EPDM rubbers, or block copolymer elastomers, especially block copolymer elastomers having polyolefinic and aromatic vinyl blocks. Among preferred thermoplastic elastomers or rubbers are EPDM rubbers. Thermoplastic elastomers offer many advantages over thermoset rubbers. Thermoplastic elastomers can be processed as a melt and, unlike thermoset materials, can be recycled by simply re-melting and re-molding. The preferred EPDM rubber provides outstanding weather resistance, good chemical resistance, good low temperature properties, and excellent thermal stability.

The thermoplastic elastomers (rubber) may include olefinic elastomers, such as EPM or special clear, transparent, or high or low haze grades of EPDM rubbers, or block copolymer elastomers, especially block copolymer elastomers having polyolefinic and aromatic vinyl blocks. Among preferred thermoplastic elastomers or rubbers are A-B-A triblock copolymers. Such triblock copolymers are well known and have been put to many diverse uses. In these triblock elastomers, the middle block is a rubbery material and the rigid endblocks act as thermally reversible physical crosslinks that enable the polymer to be processed as a thermoplastic material while retaining elastic behavior at room temperature. Thermoplastic elastomers offer many advantages over thermoset rubbers. Thermoplastic elastomers can be processed as a melt and, unlike thermoset materials, can be recycled by simply re-melting and re-molding. Among the most versatile of these thermoplastic elastomer materials has been A-B-A block copolymers having as the A blocks polystyrene or another polyvinyl aromatic hydrocarbon and as the B block an elastomer.

As with other elastomers, thermoplastic elastomers are flexible and easily distorted under an applied load. The amount of thermoplastic elastomer that is used to modify the polyolefinic material depends upon how much flexibility is required in the article to be formed from the inventive material. A greater amount of the thermoplastic elastomers may be used to make, for example, body side moldings, claddings, rocker moldings, bumper fascia, belt line seals, windshield gaskets, backlight gaskets, and sealing systems, than would be required to make other components that are used to provide structural strength, such as door posts or door panels. For seals and other components, the elastomeric properties are necessary in order to function properly.

The present inventions can have a wide range of elastomer content. For articles for which true elastomeric properties are important, such as bumpers, the elastomer may comprise up to 40% by weight of the composition, preferably up to about 15% by weight.

In one (1) preferred embodiment, the thermoplastic elastomer or rubber is an A-B-A block copolymer. The block copolymer preferably has A blocks that are polyvinyl aromatic hydrocarbon and B blocks that are poly(ethylene-butylene).

Polystyrene-poly(ethylene-butylene)-polystyrene block copolymers are well known and are described, for example, in U.S. Pat. Nos. 4,323,534; 4,355,425; and 4,880,878 all of which are incorporated herein by reference. Sytrene-poly (ethylene-butylene)-styrene block copolymers are commercially available, for example from Shell Chemical Company, Houston, Tex. under the trade designation KRATON G.

The A-B-A block copolymer can be blended with the polyolefinic resin. One (1) such polyolefin is liquid polybutene. The ratios of the elastomer or rubber component and the polyolefinic component are determined according to the desired ultimate properties. The blend may contain up to about 92% by weight polyolefinic materials and up to about 90% by weight elastomer or rubber. Preferably, the blend contains about 1% to about 70% by weight polyolefin homopolymer or copolymer, or mixtures thereof, and materials containing from about 6% to about 35% by weight polyolefinic materials are particularly preferred. When liquid polybutene is employed, the block copolymer and the polyolefin are preferably selected and apportioned so that the blend has a Shore A hardness of at least 50.

In addition to the A-B-A block copolymer and polyolefin, the compositions of the invention can also comprise other high or low haze or transparent polymers such as acrylic rubbers. When other polymers are added to the blends, they are preferably added in amounts of about 6% to about 10%, by weight.

As with other elastomers, thermoplastic elastomers are flexible and easily distorted under an applied load. The amount of thermoplastic elastomer that is used to modify the polyolefinic material depends upon how much low temperature impact is required in the article to be formed from the inventive material.

The present inventions can have a wide range of elastomer content. For articles for which true elastomeric properties are important, such as bumpers, the elastomer may comprise up to 40% by weight of the composition, preferably up to about 20% by weight.

In one preferred embodiment, the thermoplastic elastomer or an EPDM rubber. The preferred embodiment is an EPDM for example from ExxonMobil Chemical Company, Houston, Tex. under the trade designation VISTALON™.

The ratios of the elastomer or rubber component and the polyolefinic component are determined according to the desired ultimate properties. The blend can contain up to about 92% by weight polyolefinic materials and up to about 40% by weight elastomer or rubber. Preferably, the blend contains about 1% to about 70% by weight polyolefin homopolymer or copolymer, or mixtures thereof, and materials containing from about 60% to about 80% by weight polyolefinic materials are particularly preferred.

Another source for impact modification is a group of specialty elastomers from ExxonMobil called VISTAMAXX™ specialty elastomers. These elastomers are used for TPO modification, as well as film modification.

An alternative source for TPO modification is a specialized elastomer from ExxonMobil called EXXELOR™ functionalized elastomers. These are grafted maleic anhydride elastomers which exhibited excellent cold temperature impact properties with a glass transition temperature of −57° C.

Component 4: The fourth component of this invention is a coupling agent. The preferred coupling agents are grafted polymers of maleic anhydride. Coupling agents have been designed to add polarity to the polypropylene to improve the reactivity of glass fibers or inorganic fillers. The coupling agent (CA) improves physical properties such as stiffness, elongation, impact strength, and flow. The following Table 1 indicates how a 30% glass fiber in a polypropylene mixture changes with the addition of the polymer of maleic anhydride as the coupling agent:

TABLE 1

|  | Flex Modulus | Tensile Strength | Elongation at Break |
| --- | --- | --- | --- |
| 1. Without CA | 5,500 MPA | 95 MPa | 3% |
| 2. With CA | 5,700 MPa | 100 MPa | 3.25% |

In the molded product the coupling agent coats the nanocomposite particles and allows easier dispersion and improved adhesion to the polypropylene matrix. The coupling agent of choice is the maleic anhydride type. The coupling agent of choice is from ExxonMobil known as EXXELOR™ at levels between 0.1 to 5.0%

Component 5: Component five in the polyolefin composition optimally is the optimal nanocomposite or small particle size such as Talc fillers. With relatively low levels: (2 to 10%) as compared to regular filler levels of (20 to 30%), one can achieve significant gains in physical properties. The range can be 0.1 to 20% by weight of the composition. Because of these low loadings, plastic compositions using nanocomposites can maintain low specific gravities, good flow characteristics, as well as high transparency (luminous transmittance) and low haze. Nanocomposites also promote rapid crystallization. The increase in crystallization decreases cycle time and improves surface hardness. At just a 5% by weight loading of a nanocomposite, the following physical properties can be improved. The following Table 2 shows a typical TPO (thermoplastic polyolefin) composition with nanocomposites, and one without:

TABLE 2

|  | Flex Modulus | Heat Deflection | Tensile Strength | CLTE |
|---|---|---|---|---|
| 1. Without Nanocomposite | 120,000 MPa | 150 F. | 7,250 MPa | $10 \times 10^{-5}$ mm/mm |
| 2. With Nanocomposites | 500,000 MPa | 230 F. | 11,800 MPa | $5.0 \times 10^{-5}$ mm/mm |

The nanocomposite is preferably a surface modified montmorillonite mineral. In terms of compounding, nanocomposites need higher shear in order to increase the exfoliation or aspect ratio. During the compounding stages, it was found that lowering our compounding temperatures (about 20 degrees lower in all stages) helped increase the torque level or mechanical shear. Mechanical shear is defined as: to become fractured under a load due to sliding action (50% torque in the BUSS.TM. (Bazel, Switzerland). The nanocomposite composition ranged from 0.1 to 5% by weight. The preferred nanocomposites supplier is Nanocor, Inc. in Arlington Heights, Ill.

Component 6: The sixth component is the optimal nucleating agent. Nucleating agents tend to give a higher degree of crystallinity to polymers, resulting in increased mechanical properties. Some of the mechanical properties that are improved include a harder surface; higher flex modulus and more isotropic shrinkage, just to name a few. The hardness of the surface is most important. The nucleating agent raises the crystallinity temperature and provides a faster seed crystal start. The preferred nucleating/clarifying agent which is HPN-68L, a hypernucleating agent, from Milliken Chemical, Spartenburg, S.C. U.S. Pat. No. 6,465,551 to Zhao; U.S. Pat. No. 6,534,574 to Zhao; U.S. Pat. No. 6,559,211 to Zhao et al; U.S. Pat. No. 6,599,968 to Zhao et al; U.S. Pat. No. 6,599,971 to Dotson et al; U.S. Pat. No. 6,642,290 to Dotson; U.S. Pat. No. 6,936,650 to Mannion et al; and U.S. Pat. No. 6,946,507 to Mannion et al describe monocyclic nucleating agents bicyclic nucleating agents including HPN-68L and HPN-68. These patents are incorporated herein in their entireties by reference. An alternative source is NA-11 a nucleating agent from Amfine Chemical. As mentioned before, nucleating/clarifying agents give a higher degree of crystallinity to polymers, resulting in increased cycle times in an injection molding process. The following Table 3 indicates the effect of including a nucleating/clarifying agent into the polyolefin composition:

TABLE 3

|  | Flex Mod. | Izod Impact | heat deflection Temp. |
|---|---|---|---|
| 1. W/O Nucleating agent NA-11 | 1250 MPa | 3.2 Kg-cm/.cm2 | 109 C. |
| 2. With Nucleating agent NA-11 | 1700 MPa | 4.2 Kg-cm/cm2 | 130 C. |

TABLE 3-continued

|  | Crystallization Temp. | Rockwell Hardness | Gloss Index | Haze Value |
|---|---|---|---|---|
| 1. W/O Nucleating agent NA-11 | 118 C. | 100 (HRR) | 90 | 58 |
| 2. With Nucleating agent NA-11 | 130 C. | 110 (HRR) | 110 | 20 |

This is all done at relatively low usage levels: 0.1 to 0.9% by weight. Preferably, the usage level is 0.2% parts by weight of the total composition. The preferred source of nucleating/clarifying agents is Milliken Chemical Corporation located in Spartenburg, S.C.

Component 7: The surface modifier and lubricant comprises an unsaturated fatty acid ester. The preferred surface modifier's composition is a blend of complex mixture of saturated and nonsaturated fatty acid esters with modified organic acid derivatives. The function of this composition is to reduce the coefficient of friction and to improve the gloss level of the molded part. This is all done at relatively low usage levels: 0.1 to 0.9% by weight. Preferably, the usage level is 0.2% parts by weight of the total composition.

Component 8: The next component in the plastic composition is preferably the UV package. The UV package has the function to protect the surface of the molded product from being degraded by UV light resulting from outdoor exposure. The examples of parts to be protected from outdoor exposure can be automotive exterior, and interior parts, and also non-automotive parts for ATVs, motorcycles, snowmobiles and the like.

UV absorbers, hindered amine light stabilizers, and antioxidants are used in the plastics industry to protect the finished molded parts from discoloring after exposure to UV sunlight. Typical loading levels are from 0.25% to 5% by weight. Examples of UV absorbers include benzophenones and benzotriazoles commercially available from a number of suppliers such as: BASF Corp., Mt. Olive, N.J., Ciba-Geigy Corp., Hawthorne, N.Y., and Witco Corp., Greenwich, Conn. Hindered amine light stabilizers are available commercially from Ciba-Geigy (Hawthorne, N.Y.) and Cytech. Antioxidants include alkylated phenols and bisphenols, alkylidene polyphenols, organic phosites and phosphates.

Component 9: U.S. Pat. No. 6,017,989 to Malm et al describes the importance of many types of pigments. The pigments used may be inorganic or organic. Special effects pigments including flake alone or in conjunction with color pigments achieve special effects such as a metallic appearance. Inorganic types of pigments include, titanium dioxide, carbon black, red iron oxide, black iron oxide, chromium oxide green, ultramarine blue. Useful organic pigments are metallized and non-metallized azo reds, quinacridone reds, anthraquinone reds, perylene reds, copper phthalocyanine blues and greens isoindolineone oranges and yellows, carbazole violet, for instance. Inorganic and organic pigments are commercially available from many sources including BASF Corporation in Mt. Olive, N.J., Cabot Corporation, Billerica, Mass., Ciba-Geigy Corp. Newport, Del., and Mineral Pigments Corporation in Beltsville, Md.

Special effect pigments are metallic flake and pearlescent pigments including aluminums, micas, gold bronze, copper, nickel, brass, magnesium, and zinc. These types of special effect pigments are available from many sources such as Silberline, Tamaqua, Pa., EM Industries, Hawthorne, N.Y. Micas are available from The Mearl Corporation, New York, N.Y., and EM Industries, Hawthorne, N.Y. The average particle size of the dispersed pigments, including the flake, is preferably less than one micron and more preferably less than 0.2 microns.

Color concentrates which include pigments and a carrier may be added in amounts of up to 14% by weight to the polymer composition, preferably between 4% and 10% by weight. Pigments are added in varying amounts to provide opacity. Pigments are dispersed in a carrier prior to being introduced into the polymer blend. Such carriers are typically high molecular weight polyethylene or polypropy.

Heat and pressure are applied to the polymer compositions using various methods of processing can be applied such as thermoforming, extrusion, injection molding, and compression molding. The polymer compositions are formulated to have a wide range of melt flows to accommodate various processes. A wide range meaning from 2.0 to 35 g/10 in. as measured by ISO 1133. The polymer composition can be extruded into sheets such as the vinyl siding industry. The polymer composition can be injection molded into automobile exterior parts such as, but not limited to, body side moldings, claddings, ground effects, mirror housings, spoilers, interior/exterior door handles, and A,B,C, pillars on the interior. The polymer compositions can also be injection molded into non-automotive molded products such as, but not limited to, hoods for lawn equipment and snowmobiles, fenders for motorcycles and all terrain vehicles (ATV).

Automotive/non-automotive exterior components are particularly suitable for the recycling process due to the compatible nature of the polyolefins. In terms of the steps to recycle such component, the component is removed from the vehicle, fed through a shredder and ground up into "fines" or "particulates". The fines may be added to other polyolefins and reshaped through the injection molding process. The molded product can also be removed from the vehicle, shredded and ground up into "fines" and reshaped through the injection molding process without breaking down or affecting the metallic or pearlescent pigments.

EXAMPLE 1

Preparation of a Silver Frost Bumper Fascia.

The following materials were weighed into a 55 gallon drum, and then put onto a drum tumbler for 20 minutes: 60-70% by weight ACCPRO 9934 (a metallocene-catalyzed highly crystalline polypropylene available from BP Amoco, located in (Houston, Tex.), 10-20% by weight PB 0400 homopolymer (a polybutene available from Basell, (Lansing, Mich.); 20 -30% by weight VISTALON 91-09 (an EPDM rubber from EXXONMOBIL); 0.2% HPN-68 (a higher nucleating agent available from Milliken Chemical); 0.2 % PA-33 (an unsaturated fatty acid ester surface modifier from Axel Chemical), 1.0% Cyasorb 3808 (available from Cytech Industries); 0.2% Cyasorb XS4 (available from Cytech Industries);

The surface modifier is a mixture of saturated and unsaturated fatty acid esters with modified organic acid derivatives. The pellet/powder mix was then batch fed into one feeder into a 46 mm BUSS Kneader compounding extruder. The BUSS Kneader was set up as follows: zone 1: 155 C, zone 2: 160 C, zone 3: 165 C, zone 4: 170 C. The torque reader was at 50%. The materials melted together, and produced an extrudate. The extrudate was cooled by a water trough and then the strands were pelletized.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These are usually formed into a color concentrate pellet by a color house. Material Properties:
  a) A high impact polyolefin composition: Ductility (25.7J) to–30° C.
  b) High haze reading: 86% of a 40 mil sample
  c) High gloss of +90% as measured by a gloss meter
  d) Excellent scratch resistance of a rating:
    2 rating (visible line) using a 1 mm pin @ 7 N force
    2 rating (visible line) using a 1 mm pin @ 10 N force
    3 rating (visible line) using a 1 mm pin @ 15 N force
    4 rating (deeper visible line) using a 1 mm pin @ 20 N force
    tested to the Abrasion Resistance Spec: LP-463PB-54-01
  e) Excellent UV protection a DE=0.21 @ 10000Kj and a 80-90% gloss retention as tested to SAE J1960 Xenon arc weatherometer
  f) Excellent chemical resistance with a DE=0.26 tested to MS-JP9-8

EXAMPLE 2

Preparation of a Silver Bodyside Molding

The following materials were weighed into a 55 gallon drum, and then put onto a drum tumbler for 20 minutes: 70-80% by weight ACHIEVE™ 3854 (a metallocene-catalyzed highly crystalline polypropylene available from EXXONMOBIL); 10-20% by weight PB 0400 homopolymer (a polybutene available from Basell); 15-20% by weight VISTALON™ 91-09 (an EPDM rubber from EXXONMOBIL); 0.2% HPN-68 (a nucleating agent available from Milliken Chemical); 0.2 % PA-33 (an unsaturated fatty acid ester surface modifier composition from Axel Chemical), 1.0% CYASORB 3808 (available from Cytech Industries); 0. 2% CYASORB XS4™ (available from Cytech Industries) as a UV package.

The pellet/powder mix was then batch fed into one feeder into a 46 mm BUSS Kneader compounding extruder. The BUSS Kneader was set up as follows: zone 1: 155 C, zone 2: 160 C, zone 3: 165 C, zone 4: 170 C. The torque reader was at 50%. The materials melted together, producing an extrudate. The extrudate was cooled by a water trough and then the strands were pelletized.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These are usually formed into a color concentrate pellet by a color house.
  Material Properties:
  a) A high impact polyolefin composition: Ductility (25.9 J) to 0° C.
  b) High haze reading: 86% of a 40 mil sample
  c) High gloss of +90% as measured by a gloss meter
  d) Excellent scratch resistance of a rating:
    2 rating (visible line) using a 1 mm pin @ 7 N force
    2 rating (visible line) using a 1 mm pin @ 10 N force
    2 rating (visible line) using a 1 mm pin @ 15 N force 3 rating (deeper visible line) using a 1 mm pin @ 20 N force tested to the Abrasion Resistance Spec: LP-463PB-54-01 e) Excellent UV protection a DE=0.21 @ 10000Kj and a 80-90% gloss retention as tested to SAE J1960 Xenon arc weatherometer f) Excellent chemical resistance with a DE =0.15 tested to MS-JP9-8

Equivalent results were achieved with other pigments. It is intended that the foregoing description be only illustrative of the present invention and that the present invention be limited only by the hereinafter appended claims.

We claim:

1. A molded article comprising a thermoplastic composition, wherein:
   (i) the thermoolastic composition has been molded in a tool which has been polished to a SPE 1 finish and heated between 100° F. and 170° F. so that the resulting molded article (A) has a high gloss of above 90% as measured by a gloss meter, (B) has a scratch resistant surface, and (C) is ductile at 0° C. or −30° C. as measured by a multiaxial impact tester; and,
   (ii) the thermoplastic composition comprises in admixture:
      (a) a crystalline polybutene-1 in an amount between 0.1% and 60% by weight of the composition;
      (b) a crystalline polypropylene in an amount between 60% and 80% by weight of the composition;
      (c) a thermoplastic polyolefin elastomer in an amount between 15% and 40% by weight of the composition, the thermoplastic polyolefin elastomer comprising ethylene and propylene monomer units;
      (d) a lubricant additive in an amount between about 0.1% and 0.9% by weight of the composition comprising an unsaturated fatty acid ester which reduces surface friction to improve scratch and mar performance and produces a glossy finish;
      (e) optionally a hypernucleating agent that acts to provide crystallinity to the polypropylene and as a surface hardener in an amount between 0.1% and 0.9% by weight of the composition;
      (f) UV absorbers, modified amine light stabilizers and antioxidants in an amount between 0.25% to 5% by weight of the composition;
      (g) a color concentrate in an amount up to 14% by weight of the composition;
      (h) optionally a nano sized filler which improves material stability under temperature change and physical properties; and
      (i) optionally a coupling agent which couples the composition together in an amount up to about 10% by weight.

2. The molded article of claim 1 wherein:
   (i) the polybutene-1 is present in an amount from 10% to 20% by weight of the composition;
   (ii) the polypropylene is present in an amount from 60% to 70% by weight of the composition; and
   (iii) the thermoplastic polyolefin elastomer comprises an ethylene-propylene-diene monomer ("EPDM") copolymer and is present in an amount from 20% to 30% by weight of the composition.

3. The molded article of claim 1 wherein:
   (i) the polybutene-1 is present in an amount from 10% to 20% by weight of the composition;
   (ii) the polypropylene is present in an amount from 70% to 80% by weight of the composition; and
   (iii) the thermoplastic polyolefin elastomer comprises an ethylene-propylene-diene monomer ("EPDM") copolymer and is present in an amount from 15% to 20% by weight of the composition.

4. The molded article of claim 1 wherein the unsaturated fatty acid ester comprises an unsaturated fatty acid chain having between 8 and 30 carbon atoms and an ester chain having 1 to 8 carbon atoms.

5. The molded article of claim 1 containing a metallic flake or pearlescent color pigment.

6. The molded article of claim 1 wherein the hypernucleating agent is included and comprises a bicyclic hypernucleating agent.

7. The molded article of claim 1 shaped as a body part for a vehicle.

8. The molded article of claim 1 shaped as a body part for a vehicle which duplicates a paint color of the vehicle.

9. The molded article of claim 1 wherein the molded article has a depth of color and gloss that duplicate the depth of color and gloss of a painted component of an automotive exterior or interior.

10. A method for the preparation of a molded article that (A) has a high gloss of above 90% as measured by a gloss meter, (B) has a scratch resistant surface, and (C) is ductile at 0° C. or −30° C. as measured by a multiaxial impact tester, the method comprising:
   (a) providing a thermoplastic composition which comprises in admixture:
      (a-1) a crystalline polybutene-1; in an amount between 0.1% and 60% by weight of the composition;
      (a-2) a crystalline polypropylene in an amount between 60% and 80% by weight of the composition;
      (a-3) a thermoplastic polyolefin elastomer in an amount between 15% and 40% by weight of the composition, the thermoplastic polyolefin elastomer comprising ethylene and propylene monomer units;
      (a-4) a lubricant additive in an amount between about 0.1% and 0.9% by weight of the composition comprising an unsaturated fatty acid ester which reduces surface friction to improve scratch and mar performance and produces a glossy finish;
      (a-5) optionally a hypernucleating agent that acts to provide crystallinity to the polypropylene and as a surface hardener in an amount between 0.1% and 0.9% by weight of the composition;
      (a-6) UV absorbers, modified amine light stabilizers and antioxidants in an amount between 0.25% to 5% by weight of the composition;
      (a-7) a color concentrate in an amount up to 14% by weight of the composition;
      (a-8) optionally a nano sized filler which improves material stability under temperature change and physical properties; and
      (a-9) optionally a coupling agent which couples the composition together in an amount up to about 10% by weight; and
   (b) molding the thermoplastic composition in a tool which has been polished to SPE 1 finish and heated to between 100° F. and 170° F. to form the molded article that (A) has a high gloss of above 90% as measured by a gloss meter, (B) has a scratch resistant surface, and (C) is ductile at 0° C. or −30° C. as measured by a multiaxial impact tester.

11. The method of claim 10 wherein:
   (i) the polybutene-1 is present in an amount from 10% to 20% by weight of the composition;

(ii) the polypropylene is present in an amount from 60% to 70% by weight of the composition; and (iii) the thermoplastic polyolefin elastomer comprises an ethylene-propylene-diene monomer ("EPDM") copolymer and is present in an amount from 20% to 30% by weight of the composition.

12. The method of claim 10 wherein:

(i) the polybutene-1 is present in an amount from 10% to 20% by weight of the composition;

(ii) the polypropylene is present in an amount from 70% to 80% by weight of the composition; and (iii) the thermoplastic polyolefin elastomer comprises an ethylene-propylene-diene monomer ("EPDM") copolymer and is present in an amount from 15% to 20% by weight of the composition.

13. The method of claim 10 wherein the unsaturated fatty acid ester comprises an unsaturated fatty acid chain having between 8 and 30 carbon atoms and an ester chain having 1 to 8 carbon atoms.

14. The method of claim 10 wherein the hypernucleating agent is included and comprises a bicyclic hypernucleating agent.

15. The method of claim 10 wherein the composition in step (a) has been mixed in an extruder and then injection molded in the tool to produce the molded article.

16. The method of claim 10 wherein the composition in step (a) is mixed in an extruder, cut into pellets and then injection molded in the tool to produce the article.

17. The method of claim 10 wherein step (b) comprises injection molding the thermoplastic composition in the tool.

18. The method of claim 10 wherein step (b) comprises compression molding the thermoplastic composition in the tool.

19. The method of claim 10 wherein the resulting molded article has a depth of color and gloss that duplicate the depth of color and gloss of a painted component of an automotive exterior or interior.

20. A molded article comprising a thermoplastic composition, wherein:

(i) the thermoplastic composition has been molded in a tool which has been polished to a SPE 1 finish and heated between 100° F. and 170° F. so that the resulting molded article (A) has a high gloss of above 90% as measured by a gloss meter, (B) has a scratch resistant surface, and (C) is ductile at −30° C. as measured by a multiaxial impact tester; and, (iii) the thermoplastic composition comprises in admixture:

(a) a crystalline polybutene-1 present in an amount from 0.1% to 20% by weight of the composition;

(b) a crystalline polypropylene in an amount from 60% to 80% by weight of the composition;

(c) a thermoplastic polyolefin elastomer present in an amount from 15% to 30% by weight of the composition, the thermoplastic polyolefin elastomer comprising ethylene and propylene monomer units;

(d) a lubricant additive present in an amount between from 0.1% to 0.9% by weight of the composition comprising an unsaturated fatty acid ester which reduces surface friction to improve scratch and mar performance and produces a glossy finish;

(e) a hypernucleating agent that acts to provide crystallinity to the polypropylene and as a surface hardener present in an amount from 0.1% to 0.9% by weight of the composition;

(f) one or more UV components selected from the group consisting of UV absorbers, modified amine light stabilizers, antioxidants, and combinations thereof, the UV components being present in an amount from 0.25% to 5% by weight of the composition;

(g) a color concentrate present in an amount up to 14% by weight of the composition;

(h) optionally a nano sized filler which improves material stability under temperature change and physical properties; and (i) optionally a coupling agent which couples the composition together in an amount up to about 10% by weight.

21. The molded article of claim 20 wherein:

(i) the polypropylene is present in an amount from 60% to 70% by weight of the composition; and (ii) the thermoplastic polyolefin elastomer comprises an ethylene-propylene-diene monomer ("EPDM") copolymer and is present in an amount from 20% to 30% by weight of the composition.

22. The molded article of claim 20 wherein:

(i) the polypropylene is present in an amount from 70% to 80% by weight of the composition; and (ii) the thermoplastic polyolefin elastomer comprises an ethylene-propylene-diene monomer ("EPDM") copolymer and is present in an amount from 15% to 20% by weight of the composition.

23. The molded article of claim 20 wherein the unsaturated fatty acid ester comprises an unsaturated fatty acid chain having between 8 and 30 carbon atoms and an ester chain having 1 to 8 carbon atoms.

24. The molded article of claim 20 wherein the color concentrate comprises at least one of a metallic flake and a pearlescent color pigment.

25. The molded article of any one of claims 20, 21, 22, or 24 wherein the composition is shaped as a body part for a vehicle.

* * * * *